Oct. 29, 1929.  J. H. WAGENHORST  1,733,924
TIRE CARRIER
Filed Aug. 12, 1921  3 Sheets-Sheet 1
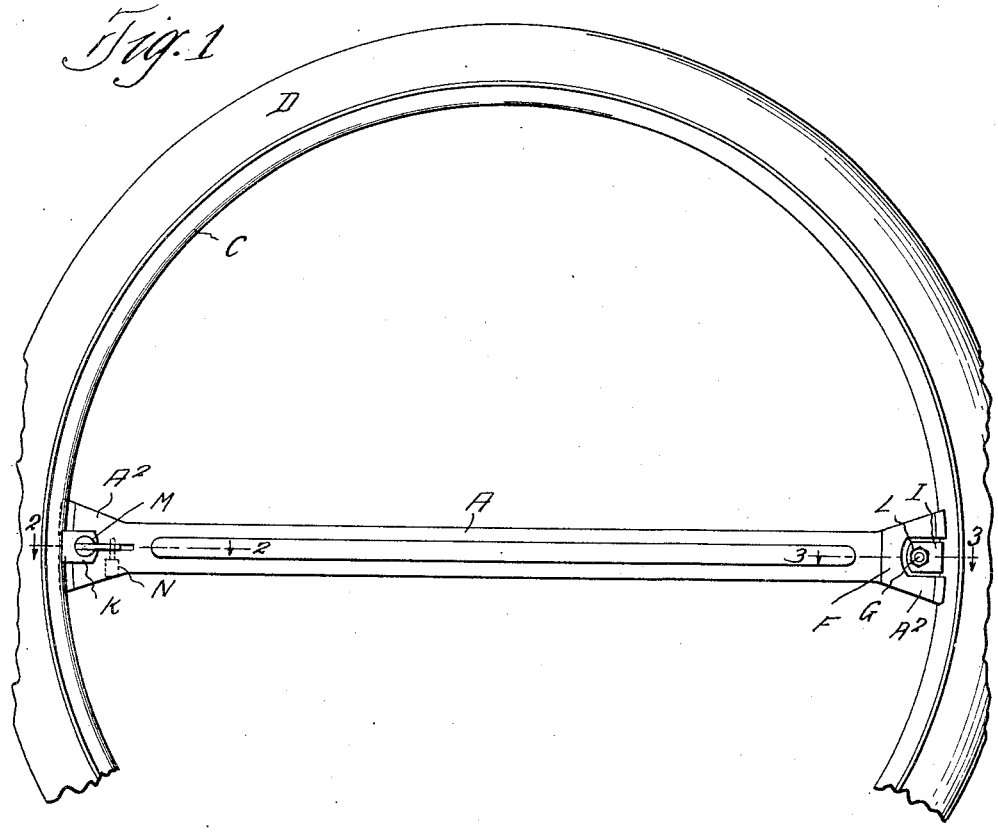
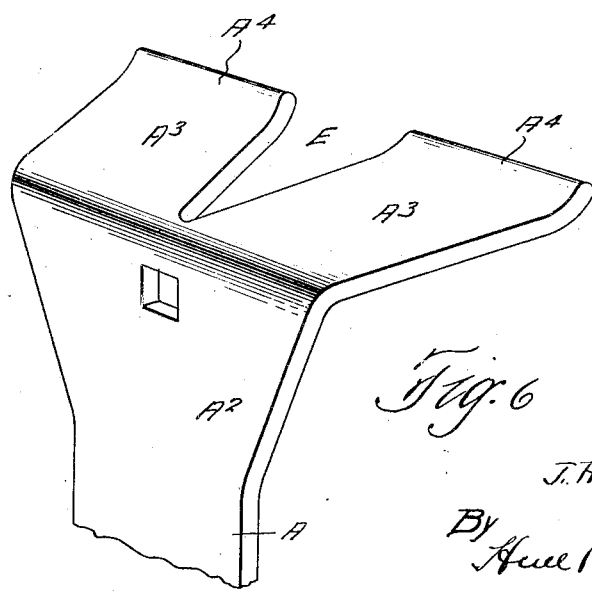
Inventor
J. H. Wagenhorst
By Hull Brock & West
Attys.

Oct. 29, 1929. J. H. WAGENHORST 1,733,924
TIRE CARRIER
Filed Aug. 12, 1921 3 Sheets-Sheet 2
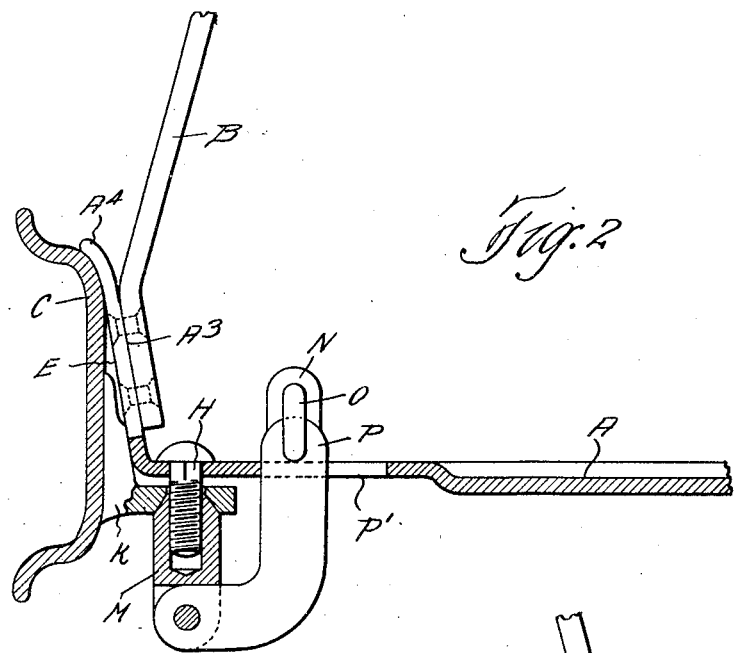
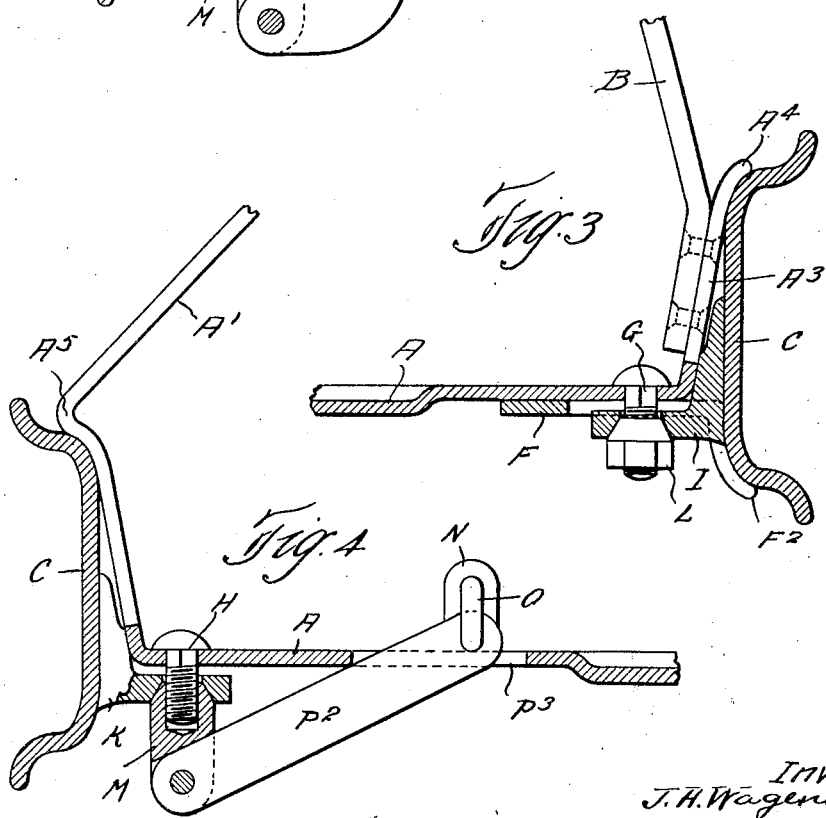
Inventor
J. H. Wagenhorst
By Hull Brock & West
Attys.

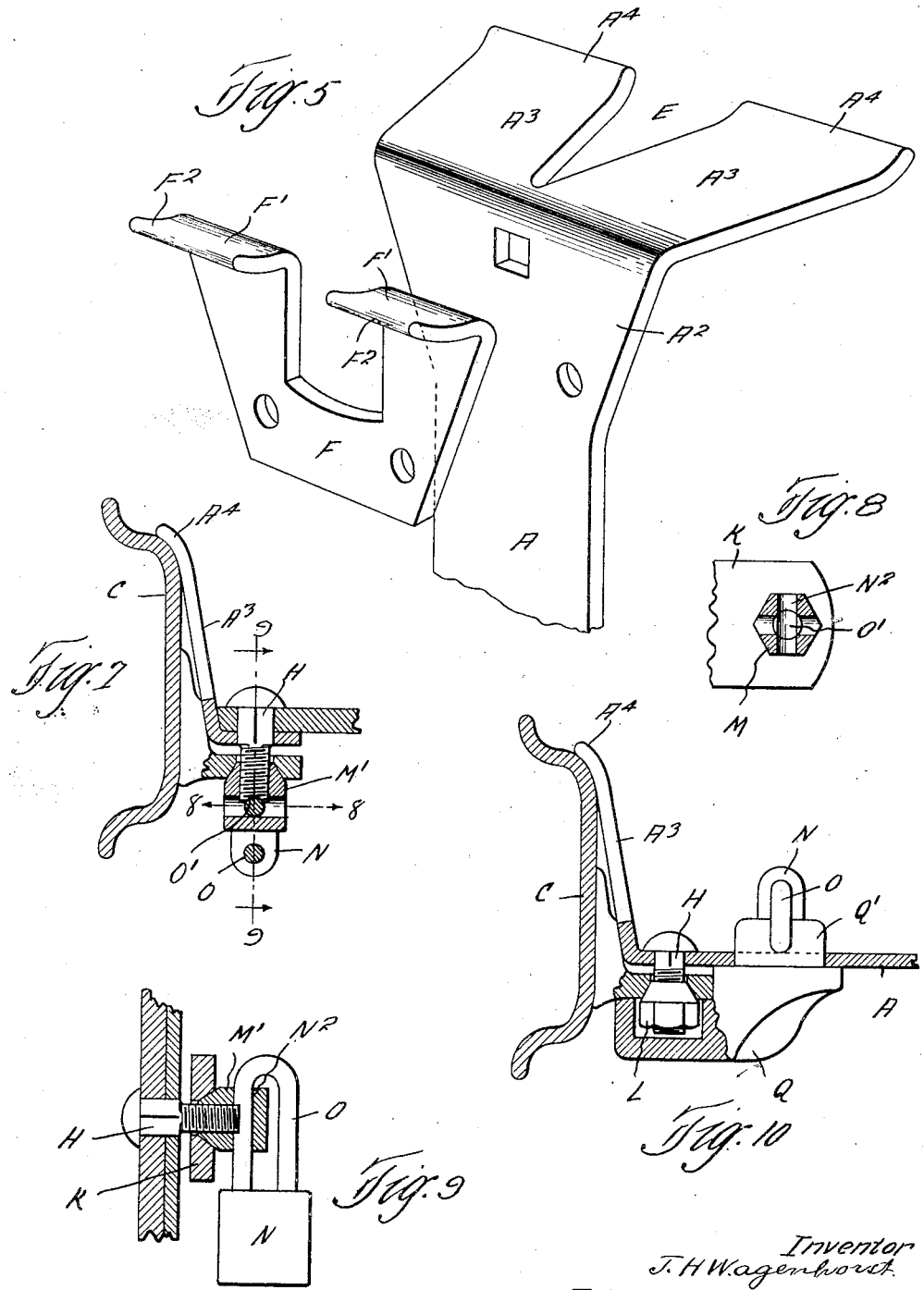

Patented Oct. 29, 1929

1,733,924

UNITED STATES PATENT OFFICE

JAMES H. WAGENHORST, OF JACKSON, MICHIGAN

TIRE CARRIER

Application filed August 12, 1921. Serial No. 491,655.

This invention relates generally to spare tire carriers for automobiles and more particularly to a tire carrier designed for carrying a demountable tie carrying rim and having an attached clamping lug as disclosed in my Patents Nos. 1,366,042 and 1,383,679.

The object of the invention is to provide an exceedingly simple and highly efficient tire carrier; one to which the tire carrying rim can be quickly and easily applied and also quickly removed, and one to which a locking device can be conveniently applied.

Another object is to provide a device consisting of a minimum number of parts and at the same time one which is light and durable. Still another object is to provide a tire holder which can also be utilized as a support for the license plate and the rear end signal lamp. With these various objects in view the invention consists in the novel features of construction and in the manner of combining or arranging the same, all of which will be more fully described and set forth in the appended claims.

In the drawings forming a part of this specification Fig. 1 is a face view of a tire carrier constructed in accordance with my invention and having a tire arranged thereon; Fig. 2 is a horizontal section taken on the line 2—2 of Fig. 1; and Fig. 3 is a sectional view taken on the line 3—3 of Fig. 1; Fig. 4 is a sectional view showing a slight modification; Fig. 5 is a detail perspective view of the rim holding parts at the right hand side of the holder, said parts being shown detached or separated; Fig. 6 is a detail perspective view of the part of the holder at the left hand side thereof; Fig. 7 is a detail sectional view of a slightly modified form of locking mechanism; Fig. 8 is a detail sectional view on the line 8—8 of Fig. 7; Fig. 9 is a detail sectional view on the line 9—9 of Fig. 7; Fig. 10 is a still further modification of the locking device.

In carrying out my invention I employ a bar A which is attached to the rear of the vehicle in any suitable manner, but preferably by means of brackets B extending rearwardly from the vehicle. In Fig. 4 I have shown the bracket A' as an integral part of the bar A. The size of the bar will, of course, be dependent upon the size of the tire carrying rim C which it is intended to receive, this rim having the inflated tire D arranged thereon in the usual manner. The ends of the bar A are slightly widened as shown at $A^2$ and these widened ends are then bent inwardly or forwardly as indicated at $A^3$, the extreme ends being turned slightly as shown at $A^4$ to provide a contact for the edge of the rim as most clearly shown in Figs. 2, 3, 7 and 10. When the bar A and bracket are made in one piece I provide an offset $A^5$ in the bracket portion with which the edge of the rim contacts as most clearly shown in Fig. 4. The widened and bent portions of the bar are also bifurcated as shown at E in order to provide a broad surface for the rim engagement without increasing the weight of the device by the employment of that amount of metal.

To the right hand side of the bar I attach a bifurcated supporting plate F having the portions F' turned rearwardly or in direction reversed to the directions of the portions $A^3$ and these parts F' are slightly rounded at their extreme ends as shown at $F^2$ to provide engaging surfaces for the edge of the rim. A bolt G is rigidly affixed to the right hand end of the bar A and projects rearwardly therefrom, said bolt extending through the bifurcated portion of the plate F and at the opposite ends of the bar I arrange a rearwardly extending bolt H, these bolts being rigidly held against turning in any suitable manner. The device thus far described constitutes my improved tire carrier and it will be understood that although I have shown the same arranged horizontally that it can be arranged vertically if so desired.

When in use the tire carrying rim is placed upon the holder by first placing the base of said rim into contact with the ends $A^3$ of the bar and F' of the plate F and at the same time the apertured lug I is fitted over the rearwardly projecting bolt G. The rim is then swung over toward the opposite end of the bar and brought into contact with the portions $A^3$ and $A^4$ and at the same time the apertured lug K is passed over the rearwardly projecting bolt H. In this manner the tire carrying rim is placed upon the holder. A nut L is screwed upon the bolt G and engages the clamping lug I and tends to force that side of the rim into firm engagement with the tire carrier. At the opposite side a nut M is screwed upon the bolt H and brought into engagement with the clamping lug K, forcing the adjacent side of the rim into firm contact with the carrier. For the purpose of locking the carrier I employ a lock N having a shackle O which is passed through an aperture in the hasp P pivotally connected to the end of the nut M as most clearly shown, the hasp P being right angular in shape and having its rear end extending through an opening P' produced in the bar A. In Fig. 4 the hasp P² is straight and the slot P³ is somewhat longer and differently positioned so as to accommodate the end of the hasp, the lock being arranged upon the inner side of the bar in exactly the same manner as previously described. In the construction shown in Fig. 7, the nut M' is bored vertically as shown at N² to receive the shackle O of the lock N and in practice I prefer to cut two transverse bores so that the shackle can be passed through any one of the four sides of the bolt; and furthermore I prefer to cut a notch O' in the end of the bolt H to receive the shackle when the nut is screwed up tight against the clamp K. In Fig. 10 an ordinary nut L is secured upon the end of the bolt H and a recessed forging or casting Q is placed thereover, said forging or casting Q having an inwardly projecting portion Q' through which the shackle O of the lock N passes.

To remove the tire carrying rim from the carrier it will be understood that the lock is first unlocked and removed from the hasp and said hasp is swung around and used as a wrench for turning the nut loose from the bolt H. When this is accomplished that side of the rim can be swung rearwardly, lifting the opposite side of the rim away from the rim supporting portions A³, A⁴ and F' and F² at the opposite side of the bar. If desired the bar can be corrugated in any suitable manner in order to strengthen the same and this bar can be utilized if desired for the attachment of the license plate and rear end signal lamp.

It will thus be seen that I provide a cheap, simple, light and durable tire carrier particularly adapted for use in connection with demountable tire carrying rims having attached clamping lugs.

Having thus described my invention, what I claim is:

1. A carrier for rims having a plurality of attached, apertured securing lugs including a member supported by the body of the vehicle and formed to provide a seat for the rim, a stud carried by said member and adapted to extend through the aperture of one of said lugs, a nut screwed on said stud, and a hasp pivotally connected to said nut and swinging through a slot in said member.

2. A carrier for rims having a plurality of attached, apertured securing lugs including a member supported by the vehicle and formed to provide spaced seats for the rear edge of the rim on opposite sides of one of the securing lugs, a stud carried by said member and adapted to extend through the aperture of said securing lug, and a nut screwed on said stud and adapted to engage said lug.

3. A carrier for rims having a plurality of attached, apertured securing lugs comprising brackets carried by the vehicle, a pair of members each having spaced seats for the rear edge of the rim on opposite sides of one of the securing lugs, a stud carried by each member and adapted to extend through the aperture of the corresponding securing lug, a cross-bar connecting said members, and nuts screwed on said studs and adapted to engage said lugs.

4. A carrier for rims having attached thereto a plurality of apertured securing lugs comprising brackets carried by the vehicle, a cross-bar carried by said brackets, both ends of said cross-bar being provided with portions engaging one edge of the rim, a member attached to one end of the cross-bar and engaging the other edge of the rim, studs carried by said cross bar near the ends thereof and adapted to extend through the apertures of certain of the attached lugs, and nuts screwed on said studs and adapted to engage said lugs.

In testimony whereof, I hereunto affix my signature.

JAMES H. WAGENHORST.